United States Patent Office 3,798,218
Patented Mar. 19, 1974

3,798,218
2-ISOPROPYL TETRAHYDRO-1,3-SUBSTITUTED OXAZINES
Claude P. Fauran and Colette Douzon, Paris, Gerald J. Huguet, Malesherbes, Guy M. Raynaud, Paris, and Yves A. Bailly, Nanterre, France, assignors to Delalande S.A., Courbevoie, France
No Drawing. Filed May 9, 1972, Ser. No. 251,776
Claims priority, application France, May 11, 1971, 7116981
Int. Cl. C07d 87/06
U.S. Cl. 260—246 R                  4 Claims

ABSTRACT OF THE DISCLOSURE

Compounds of the formula

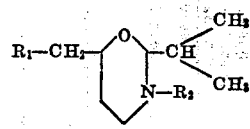

in which:
$R_1$ is methoxy, phenoxy or morpholino, and
$R_2$ is hydrogen, benzoyl, substituted benzoyl, p-toluenesulfonyl, alkylaminocarbonyl or arylaminocarbonyl, is prepared by cyclizing

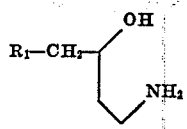

with

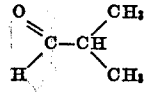

to produce the compounds of the first-named formula in which $R_2$ is hydrogen. Compounds of the first-named formula in which $R_2$ is other than H are prepared by acylation. The compounds possess analgesic, antiinflammatory, analeptic respiratory, hypotensive, spasmolytic and antiulcerous properties.

---

The present invention relates to novel 2-isopropyl tetrahydro-1,3-substituted oxazines, their process of preparation and their therapeutic application.

The novel compounds in accordance with the invention correspond to the general formula:

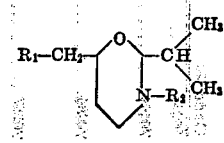

(I)

in which:
$R_1$ represents a methoxy, phenoxy or morpholino radical, and
$R_2$ represents a hydrogen atom, an optionally-substituted benzoyl radical, a p-toluene-sulfonyl radical or an alkyl- or aryl-aminocarbonyl radical.

The process according to the invention comprises, in a first stage, cyclizing an amino-alcohol of formula:

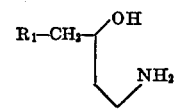

(II)

in which $R_1$ has the same signification as in Formula I, with the aid of isobutyraldehyde of formula:

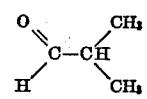

(III)

to produce a compound of Formula I in which $R_2$ is a hydrogen atom, and then, if desired, acylating said compound of formula:

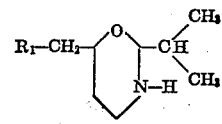

(Ia)

with a compound capable of furnishing a group $R_2$ having the same signification as in Formula I, except for hydrogen.

When the radical $R_2$ of the Formula I is an optionally-substituted benzoyl radical or a p-toluene-sulfonyl radical, the compound of Formula Ia is acylated with the aid of the corresponding acid chloride.

When the same radical $R_2$ is an alkyl- or aryl-amino carbonyl radical, the compound of Formula Ia is acylated with the aid of the corresponding isocyanate.

The following preparations are given by way of example to illustrate the invention.

EXAMPLE 1

2-isopropyl-6-phenoxymethyl tetrahydro-1,3-oxazine (Code No. 7017)

90 g. of 1-phenoxy-4-amino-2-butanol are dissolved, with warming to 60° C., in 500 ml. of anhydrous benzene and then 40 g. of isobutyraldehyde are added thereto, and the mixture is heated to boiling. With the aid of a Dean-Stark apparatus, the water entrained by distillation of the benzene may be recovered.

After 2 hours of warming, the mixture is concentrated. The crude product obtained is purified by distillation under reduced pressure.

Boiling point=115° C. under 0.2 mm. Hg
Yield=80%
Empirical formula=$C_{14}H_{21}NO_2$ Elementary analysis.—Calculated (percent): C, 71.45; H, 9.00; N, 5.95. Found (percent): C, 71.26; H, 8.89; N, 6.02.

EXAMPLE 2

2-isopropyl-3-benzoyl-6-phenoxymethyl tetrahydro-1,3-oxazine (Code No. 7047)

20 g. of triethylamine and 47 g. of 2-isopropyl-6-phenoxymethyl tetrahydro-1,3-oxazine prepared by Example 1 are introduced into 200 ml. of benzene. A benzene solution of 29 g. of benzoyl chloride is then added, slowly and with agitation, thereto. The mixture is cooled in order to maintain the temperature at 25° C. Agitation is continued for a further 3 hours. The precipitate of triethylamine hydrochloride is dried, the filtrate is concentrated and the desired crude product is obtained which is recrystallized from isopropyl ether.

Melting point=64° C.
Yield=72%
Empirical formula=$C_{21}H_{25}NO_3$

Elementary analysis.—Calculated (percent): C, 74.31; H, 7.42; N, 4.13. Found (percent): C, 74.46; H, 7.41; N, 4.19.

EXAMPLE 3

2-isopropyl-6-phenoxymethyl-3-p-toluene sulfonyl tetrahydro-1,3-oxazine (Code No. 70169)

350 ml. of pyridine and 45 g. of 2-isopropyl-6-phenoxymethyl tetrahydro-1,3-oxazine prepared by Example 1 are introduced into a 1 litre reaction vessel. The mixture is cooled to 0° C. and 40 g. of p-toluenesulfonyl chloride in pyridine is slowly added thereto. After 2 hours in contact, the temperature of the mixture is allowed to rise to ambient temperature and the mixture is diluted with 1.5 l. of water. The product which is precipitated is dried and crystallized from isopropyl alcohol.

Melting point=88° C.
Yield=58%
Empirical formula=$C_{21}H_{27}NO_4S$

Elementary analysis.—Calculated (percent): C, 64.75; H, 6.99; N, 3.60. Found (percent): C, 64.86; H, 7.00; N, 3.81.

EXAMPLE 4

2-isopropyl-3-isopropyl aminocarbonyl-6-phenoxymethyl tetrahydro-1,3-oxazine (Code No. 7062)

47 g. of 2-isopropyl-6-phenoxymethyl tetrahydro-1,3-oxazine prepared by Example 1, and 2 ml. of pyridine are introduced into 300 ml. of benzene. There is slowly added thereto a benzene solution of isopropyl isocyanate (17 g.). The temperature of the mixture progressively increases to about 30° C. After a further 3 hours, the temperature has increased to 45° C. The benzene is then evaporated and the crude product is recrystallized from isopropyl ether.

Melting point=86° C.
Yield=65%
Empirical formula=$C_{18}H_{18}N_2O_3$

Elementary analysis.—Calculated (percent): C, 67.47; H, 8.81; N, 8.47. Found (percent): C, 67.28; H, 8.84; N, 8.76.

The following Table I indicates the identification characteristics of other compounds of Formula I, and gives in each case, the particular mode of operation to be applied,

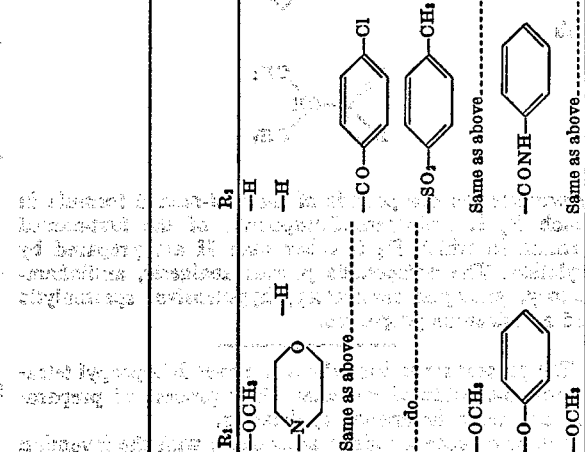

TABLE I

The compounds of Formula I have been studied on animals in the laboratory and have been shown to possess analgesic, antiinflammatory, analeptic respiratory, hypotensive, spasmolytic and antiulcerous properties.

(1) ANALGESIC PROPERTIES

The compounds of Formula I administered by oral means on the mouse are capable of reducing the number of painful stretchings produced by the intraperitoneal injection of acetic acid.

The results obtained with a certain number of these compounds are given in the following Table II, the dose administered being 100 mg./kg./PO.

TABLE II

| Code No. of compound tested | Percentage reduction number of stretchings, percent |
|---|---|
| 7047 | 56 |
| 7062 | 50 |
| 70138 | 45 |
| 70169 | 45 |
| 70261 | 75 |

(2) ANTIINFLAMMATORY PROPERTIES

The compounds of Formula I, administered by oral means on the rat, are capable of reducing the under-planatary oedema produced by the local injection of a phlogogenic agent, such as carraghenine.

By way of examples, administered in a dose of 200 mg./kg./PO the compounds No. 7062, 70261 and 70281 respectively reduce the under-planatary oedema by 65%, 65% and 40%.

(3) ANALEPTIC RESPIRATORY PROPERTIES

The compounds of Formula I, administered by intravenous means on an anaethetized guinea-pig are capable of opposing the respiratory depression provoked by morphine.

Moreover, in a dose of 2.5 mg./kg./IV, the compound No. 7047 augments by 40% the respiratory frequency of a guinea-pig in which te respiration is depressed.

(4) HYPOTENSIVE PROPERTIES

Administered by intravenous means on the anasthetized rat, the compounds of Formula I provoke a lowering of the arterial pressure.

The results obtained with a certain number of compounds of Formula I are given in the following Table III.

TABLE III

| Code No. of compound tested | Dose administered, mg./kg./i.v. | Lowering of arterial pressure Intensity, percent | Duration, mn. |
|---|---|---|---|
| 7047 | 2 | 40 | >30 |
| 70169 | 2 | 35 | >30 |
| 70257 | 2 | 50 | >30 |
| 70261 | 1 | 50 | >30 |

(5) SPASOMOLYTIC PROPERTIES

The compounds of Formula I, introduced in the conserving medium, are capable of opposing the contractural action of barium chloride on the isolated duodenum of the rat. This activity is evaluated by taking papaverine as standard.

By way of example, the spasmolytic activity of compound No. 70280 is equivalent to that of papaverine.

(6) ANTIULCEROUS PROPERTIES

The compounds of Formula I reduce the number of gastric ulcers provoked in the rat by the intraperitoneal injection of reserpine in a dose of 5 mg./kg., the said compounds being administered by oral means simultaneously.

By way of example, in a dose of 50 mg./kg./PO., the compound No. 70280 reduce the number of ulcers by 70%.

One can see from the results shown above and those shown in the following Table IV, the difference between the pharmacologically active dose and the lethal dose is sufficiently great to permit the compounds of Formula I to be used in therapeutics.

TABLE IV

| Code No. of compound tested | Dose administered, mg./kg./p.o. | Percentage mortality (mouse) |
|---|---|---|
| 7047 | 2,000 | 0 |
| 7062 | 2,000 | 0 |
| 70138 | 2,000 | 0 |
| 70169 | 2,000 | 0 |
| 70257 | 1,000 | ≃50 |
| 70261 | 2,000 | 0 |
| 70280 | 700 | ≃50 |
| 70281 | 2,000 | 0 |

The compounds of Formula I are useful in the treatment of inflammatory and other pains, hypertensions, respiratory insufficiencies, digestive and other smooth fibre spasms, and gastro duodenal ulcers.

They may be administered by oral means in the form of tablets, dragées and gelules containing 50 to 400 mg. of active ingredient (3 to 5 times a day) and by rectal means in the form of suppositories containing 50 to 200 mg. of active ingredient (1 or 2 times a day).

Accordingly, the present invention also relates to a therapeutic composition comprising a compound of the Formula I together with a therapeutically acceptable carrier.

What we claim is:

1. A compound of the formula:

$$R_1-CH_2-\underset{\underset{N-R_2}{\diagup}}{\overset{O}{\diagdown}}-C\overset{H}{\underset{CH_3}{\diagdown}}\overset{CH_3}{\diagup}$$

in which:

$R_1$ is methoxy, phenoxy or morpholino, and $R_2$ is hydrogen, benzoyl, p-chlorobenzoyl, p-toluene sulfonyl, isopropylaminocarbonyl or phenylaminocarbonyl.

2. A compound as claimed in claim 1, in which $R_2$ is p-chlorobenzoyl.

3. A compound as claimed in claim 1, in which $R_2$ is isopropylaminocarbonyl or phenylaminocarbonyl.

4. A compound as claimed in claim 1, in which $R_1$ is morpholino and $R_2$ is p-chlorobenzoyl.

References Cited
UNITED STATES PATENTS

| 3,707,541 | 12/1972 | Lajiness | 260—244 |
| 3,558,615 | 6/1971 | Haynes et al. | 260—244 |
| 3,385,828 | 5/1968 | Kocher et al. | 260—244 |

HARRY I. MOATZ, Primary Examiner

U.S. Cl. X.R.

260—244 R, 247.5 R, 570.6, 584 R; 424—248